July 7, 1959   C. ADAMS, JR   2,893,670
PIPE HANGER
Filed April 28, 1954

CHARLES ADAMS, JR.
INVENTOR.

BY *Louis L. Amant*
his ATTORNEY.

United States Patent Office 2,893,670
Patented July 7, 1959

2,893,670

PIPE HANGER

Charles Adams, Jr., Croton-on-Hudson, N.Y.

Application April 28, 1954, Serial No. 426,201

9 Claims. (Cl. 248—59)

The present invention relates to pipe hangers and an important object of the invention is to provide novel and advantageous adjustable pipe hangers.

Another object of the invention is to provide novel and advantageous pipe hangers which can readily be assembled.

Another object of the invention is to provide pipe hangers of the character specified which are simple in construction, economical to manufacture, and effective in use for the purpose specified.

Yet another object of the invention is to provide pipe holders of the character specified comprising novel and advantageous means for locking movable adjustable parts against accidental changes of adjustment while supporting a pipe.

A further object of the invention is to provide a novel and advantageous pipe hanger wherein the weight of the pipe is distributed between different parts of the pipe hanger so as to increase the weight supporting capacity of the hanger.

Other objects, features and advantages will appear upon consideration of the following detailed description and of the drawings in which.

Figure 1:
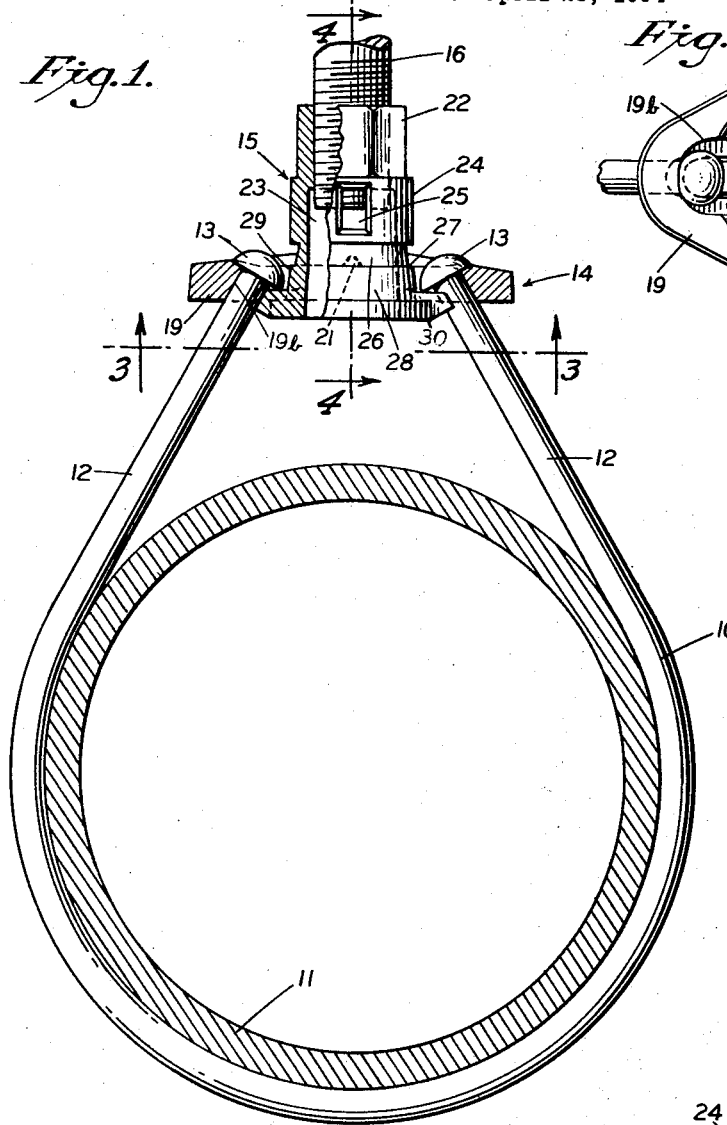
Fig. 1 is a view of a pipe and pipe hanger according to the present invention, partly in section in a plane perpendicular to the axis of the pipe and partly broken away to show the underlying structure.

The preferred embodiment of pipe hanger herein disclosed comprises a resilient pipe-containing member or loop 10 of suitable material such as round wire supporting a pipe 11 and having two upstanding ends 12 with integral heads 13 which may be in the form of buttons. Preferably each head or button 13 is substantially circular in contour and is symmetrically disposed with reference to the corresponding end. The lower or underface of each head 13 is plane and substantially perpendicular to the corresponding end for reasons to be brought out hereinafter.

Ordinarily each loop 10 would be placed over the end of a pipe 11 to be suspended, but in some instances a loop 10 of resilient material can be pulled open and placed over the pipe laterally. Said loop 10 is of such shape as to cooperate effectively with the novel forms of yoke 14 and a center member or nut 15 of the present invention, the nut having attachment means adapted to cooperate with the lower end of a rod or bolt 16 such as by threads and supported at its upper part by a beam or other suitable means.

Figure 2:
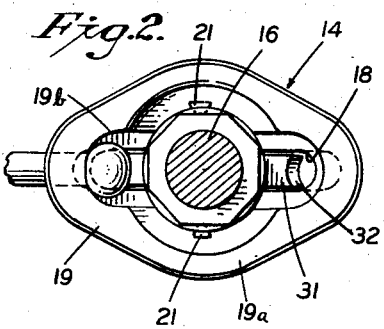
Fig. 2 is a top plan view of the pipe hanger of Fig. 1, the end of one side of the pipe-supporting loop being omitted.
Figure 3:
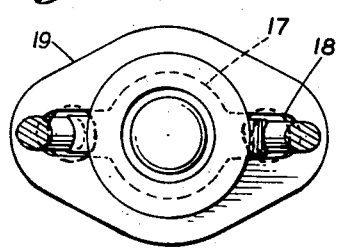
Fig. 3 is a section taken on the line 3—3 of Fig. 1.
Figure 4:
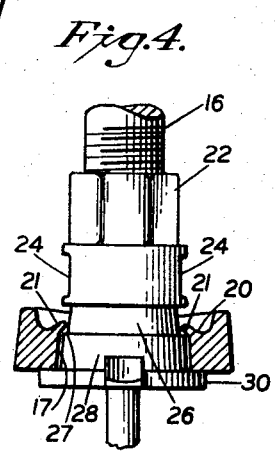
Fig. 4 is a sectional view taken along the line 4—4 of Fig. 1.

Said yoke 14 is of suitable material such as malleable iron and is substantially flat with a generally oval outline. At its central portion said yoke 14 has a round opening 17 with opposite extensions or extension openings 18 to accommodate said upper ends 12 and heads 13 of the loop. Said extensions 18 of said opening 17 are in opposite extensions 19 of yoke 14 and have around the tops of said extensions, plane surfaces 19a (Fig. 2) inclined downwardly and inwardly at such inclination that the bottoms of heads 13 of ends 12 of the loop will seat thereon. Said ends 12 of the loop 10 extend substantially tangentially from the pipe 11 and said extension openings 18 comprise grooves 19b (Fig. 1) of greater width than the diameters of said loop ends 12 and their bottoms are rounded in cross section and inclined downwardly and outwardly to fit said upper ends 12. At the upper face of yoke 14 said opening 17 is enlarged to provide a shelf 20 from the inner edge of which two tongues 21 project upwardly. Due to the malleable material of the yoke, these tongues may be bent so as to connect said yoke 14 to said nut 15 to prevent accidental separation thereof when assembled.

Said central member or nut 15 has its upper end connected with the rod 16 such as by a part 22 internally threaded to screw on the threaded lower end of rod 16 and formed externally, preferably with a hexagonal cross section, for engagement by a wrench. Below the internally threaded portion, the internal passage of the nut is enlarged in diameter, and below said part 22 of the nut, has a cylindrical part 23 of greater diameter extending to the lower end of the nut. The nut 15 itself comprises at the lower end of part 22 a part 24 of greater external diameter and having windows 25 through which the position of the lower end of rod 16 can be observed.

Below the lower end of part 24 there is a part 26 having an upper end of less external diameter than the lower end of part 24 and a downwardly expanding frusto-conical lateral surface terminating in a shelf 27. Below said shelf is a part 28 of the nut having a downwardly expanding frusto-conical surface 29 and integrally connected at its lower end to an annular part comprising an outwardly projecting flange 30 adapted to engage the lower face of the yoke 14 around the opening 17.

At two opposite sides, the nut 15 is provided with a clamping surface which may be carried by lugs 31 projecting outwardly from flange 30 and part 28. Said lugs are provided at their outer ends with downwardly and outwardly inclined grooves 32 forming circular clamping surfaces in which the ends 12 of the loop 10 will fit and upper surfaces for engagement by the inner edges or surfaces of the heads or buttons 13. Said lugs 31 enter the lower ends of said extension openings 18 and lock the nut and yoke against accidental relative turning movements.

In applying the pipe hanger to a pipe 11, the loop 10 of wire may be placed on the pipe over the end thereof and the upwardly extending ends 12 are pressed inwardly so as to enter the central opening 17 in the yoke 14. When released the upper ends 12 will seat themselves in extension openings 18 of the yoke 14 with the lower surfaces of the heads resting on the inclined surfaces 19a. Then the nut 15 is moved upwardly through the central opening 17 of the yoke and the internally threaded upper end 22 is screwed on the threaded lower end of the stationary supporting rod 16. During this movement of the nut 15 the pipe and yoke 14 must be raised high enough so that turning of the nut 15 will not be blocked by engagement of the lugs 31 with the upper ends 12 of the loop.

When the nut is raised to the desired level by turning the same the pipe 11 is lowered, the ends 12 of the loop come into grooves 32 at the outer ends of the lugs 31, the lugs 31 enter grooves 19b, and the upper faces of the lugs 31 are engaged by the heads 13 of the loop ends 12. The nut 15 may be turned by use of a wrench on the hexagonal part 22 until it reaches the desired level as indicated by the position of the lower end of the rod 16 through one of the windows 25 in the part 24 of the nut. When the parts are assembled in this way the tongues 21 of the yoke 14 may be knocked or pressed down until they enter the groove above the shelf 27. With the tongues displaced in this way the yoke can be moved up and down only a limited distance with reference to the nut 15 and there is no danger of the nut dropping out of the yoke. Due to the frusto-conical outer surface of part 26 of the unit, lifting of the yoke will separate the inner ends of tongues 21 from such frusto-conical surface and facilitate the turning of the nut.

It will be evident that the connection between the central member or nut, the yoke and the upper ends 12 of the loop are very strong and there is a very effective locking of the yoke and nut against relative movement. The outer sides of the loop ends 12 are seated against the ends of the extension openings 18 of the yoke and in the grooves 32 in the lugs 31 which project outwardly from flange 30 and part 28 of the nut and enter extension openings 18. The upper ends 12 of the loop are pressed firmly against the bottoms of the grooves at opposite sides thereof due to the wedging action. The flange 30 at the lower end of the nut acts to support the yoke and the lugs 31 projecting from the lower end of the nut 15 act through said loop ends 12 to support the yoke 14 and by engagement with the heads 13 to support the loop ends 12. The frusto-conical outer surface above the shelf 27 facilitates upward and downward play between the yoke and the nut to permit relative adjustment of these parts.

Tongues on lips 21 are of value principally to hold the assembly of loop 10, yoke 14 and nut 15 together for shipping. In the first installation the loop 10 is placed over the end of a pipe, moved to the proper position under a threaded rod 16, and the nut 15 screwed on the rod as required. If it is desired to use the assembly to support a pipe already installed, the tongues 21 of the yoke 14 may be sheared off by driving the nut downwardly through the yoke. Then the ends 12 of the loop may be pressed together and withdrawn from the yoke. The loop 10 may then be spread and placed over the pipe to be supported, the ends 12 pressed together and inserted in the yoke, and the nut 13 inserted and screwed on a properly positioned rod 14.

It should be understood that various changes may be made and certain features used without others, without departing from the true spirit and scope of the invention.

What is claimed is:

1. A pipe hanging assembly for use with a fixed suspension rod having a screw threaded lower end, comprising a loop of wire having a pipe enclosing part and straight ends extending tangentially with respect to the loop and converging upwardly therefrom, heads for said straight ends extending outwardly around and symmetrical with respect thereto and having flat lower surfaces, a yoke having a central opening and opposite extension openings receiving said straight ends, upwardly and outwardly inclined seats for said heads on said yoke on each side of said extension openings, each extension opening having an end surface inclined downwardly and outwardly and which fit said upwardly converging straight ends below said heads, and a nut threaded on said suspension rod and extending upwardly through said yoke and engaging the lower side thereof and the inner sides of said straight ends and holding them in said extension openings in the yoke, and clamping the straight ends between the end surface and the nut.

2. A pipe hanging assembly according to claim 9 wherein said central member has a flange engaging the lower face of said yoke.

3. A pipe hanging assembly according to claim 9 wherein said central member is provided with two lugs on opposite sides thereof projecting into said extension openings in said yoke to prevent relative rotation, and the end of each lug carrying the inclined clamping surface.

4. A pipe hanging assembly according to claim 3 wherein said lugs have downwardly and outwardly inclined grooves engaging said straight ends and holding them in definite position in said yoke.

5. A pipe hanging assembly according to claim 3 wherein said lugs have an upper surface to support the inner sides of said heads of said straight portions of the loop.

6. A pipe hanging assembly according to claim 9 wherein said yoke has bendable tongues around its central opening and said central member is provided with a groove into which said tongues are bent to prevent said central member from dropping out of said yoke although permitting limited relative movement.

7. A pipe hanging assembly according to claim 9 wherein said yoke has bendable tongues around its central opening and said central member is provided with a circumferential groove into which said tongues are bent to prevent said nut from dropping out of said yoke although permitting limited relative movement; said circumferential groove having upwardly directed sides and an upwardly converging inner wall.

8. A pipe hanging assembly according to claim 9 wherein said central member has a flange engaging the lower side of said yoke and an upwardly converging frusto-conical section immediately above said flange, and lugs projecting from said flange and the lower part of said frusto-conical section into said grooves of the extension openings of said yoke, said lugs having upwardly and outwardly inclined surfaces engaging the bottoms of the inner portions of said heads, said frusto-conical section providing additional space between said section and said heads when the yoke is raised with reference to the central member.

9. A pipe hanging assembly for use with a suspension means comprising a circular loop of wire forming a pipe enclosing part and straight ends extending tangentially with respect to the loop and converging upwardly therefrom, a head on each straight end projecting symmetrically around the end and having a flat lower surface extending at right angles to the straight end, a yoke having a central opening and opposite extension openings receiving said straight ends, upwardly and outwardly inclined seats for said heads on said yoke on each side of said extension openings, the inclined seats corresponding with the angle of the flat surface of the head of the loop when in assembled relation, each extension opening having an end surface inclined downwardly and outwardly so as to engage said upwardly converging straight ends below said heads, and a central member having means for attachment on said suspension means, the central member extending upwardly through the central opening of said yoke and engaging the lower side thereof and having a clamping surface extending at an angle corresponding to the straight end of the loop when assembled to engage the inner side of each straight end of the loop and holding them in said extension openings in the yoke and clamping each straight end between the end surface and the clamping surface of the central member.

References Cited in the file of this patent

UNITED STATES PATENTS

| 566,690 | Kling | Aug. 25, 1896 |
| 1,870,083 | Zifferer | Aug. 2, 1932 |
| 1,904,315 | Kenway | Apr. 18, 1933 |
| 2,551,803 | Leonard | May 8, 1951 |
| 2,762,592 | Adams | Sept. 11, 1956 |